United States Patent [19]

Chen

[11] Patent Number: 4,462,095
[45] Date of Patent: Jul. 24, 1984

[54] MOVING DIFFRACTION GRATING FOR AN INFORMATION TRACK CENTERING SYSTEM FOR OPTICAL RECORDING

[75] Inventor: Di Chen, Colorado Springs, Colo.

[73] Assignee: Magnetic Peripherals Inc., Minneapolis, Minn.

[21] Appl. No.: 359,641

[22] Filed: Mar. 19, 1982

[51] Int. Cl.³ .................... H04N 5/76; G11B 21/10
[52] U.S. Cl. ............................. 369/44; 369/46
[58] Field of Search ............... 358/342; 369/43, 44, 369/45, 46; 250/201

[56] References Cited

U.S. PATENT DOCUMENTS

| 4,063,287 | 12/1977 | van Rosmalen | 358/128 |
| 4,118,735 | 10/1978 | Wilkinson | 369/44 |
| 4,305,144 | 12/1981 | Okada | 369/46 |

FOREIGN PATENT DOCUMENTS 2016747  9/1979  United Kingdom .

Primary Examiner—Robert L. Richardson
Attorney, Agent, or Firm—W. J. McGinnis, Jr.; J. A. Genovese

[57] ABSTRACT

In an optical recording system for both reading and writing, the laser beam is projected to the media through a diffraction grating which generates a plus one and minus one order beam ahead of and behind the main zero order beam. The grating is driven by an oscillating driver so as to wobble in a fashion which leaves the zero order beam unaffected but causes the plus one and minus one order beams to move inwardly and outwardly, radially, with respect to the information track on the media in opposite fashions. The wobbling plus one and minus one order beams are used to generate differential signals from separate detectors and are passed through a band pass filter to generate a radial position error signal which may be used to drive the write/read head inwardly or outwardly to remain positioned over a particular information track.

3 Claims, 7 Drawing Figures

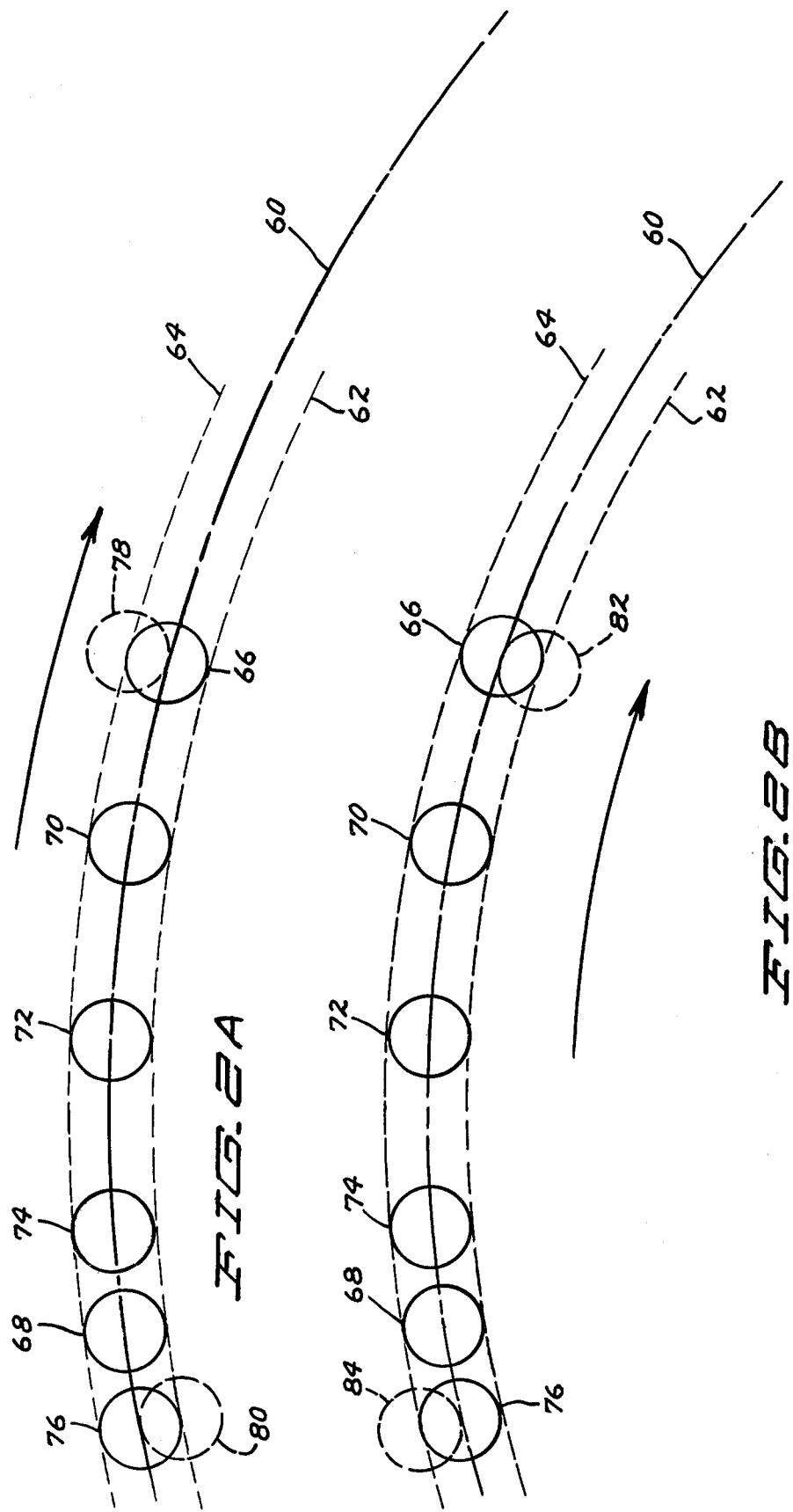

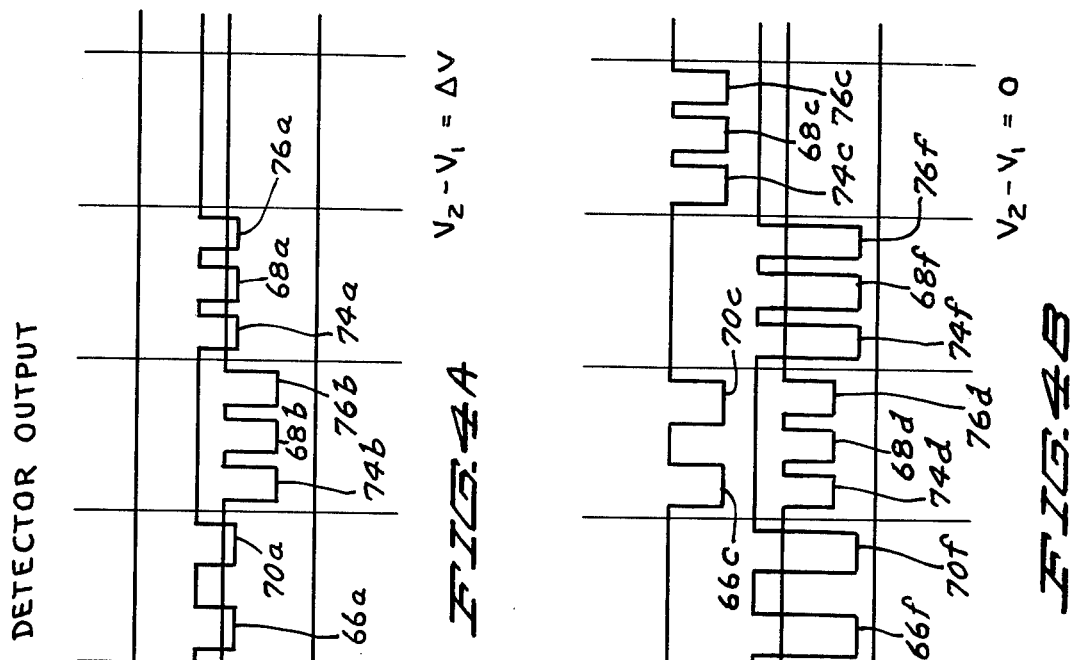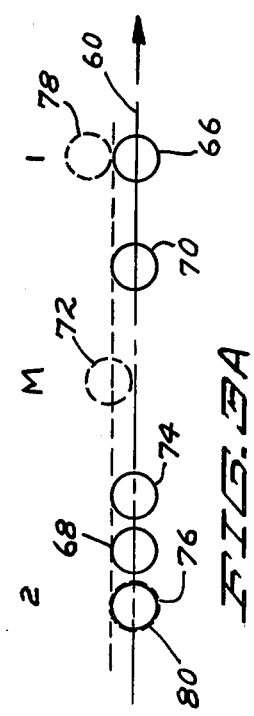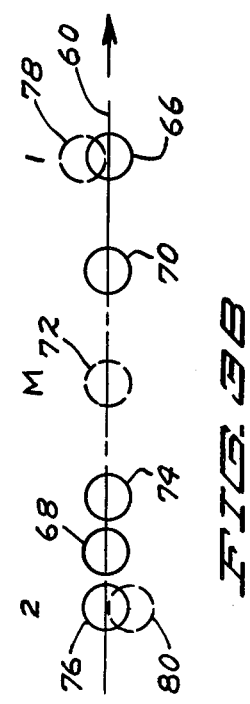

MOVING DIFFRACTION GRATING FOR AN INFORMATION TRACK CENTERING SYSTEM FOR OPTICAL RECORDING

BACKGROUND OF THE INVENTION

The present invention relates to optical information recording systems. In particular, the present invention has application for optical recording systems for both reading and writing data. The invention relates to radial position detection of the read/write head in order to keep the head properly positioned over an information track on a recording media disk. In particular, such a recording media disk may be preformatted with clock information for use during the writing of information and the clock information may be sufficient to maintain the write/read head properly positioned over the preformatted track during the writing operation.

U.S. Pat. No. 4,063,287 relates to optical recording and shows an oscillating tracking mirror device for oscillating the radiation beam transversely with respect to the information track on an optical media disk. By scanning the information track transversely using the oscillating mirror, the information track may be followed using the tracking mirror device in order to maintain proper position of the information track with respect to the reflected beam detecting system. The patent does not show operation in the radial direction of the read/write head using the information generated using the oscillating tracking mirror device. The system according to the patent shows only the generation of a single radiation beam to be reflected from the optical media disk to provide tracking information as well as the other information derived from the reflected beam.

Also known to applicant is a United Kingdom published patent application, Publication No. GB 2 016 747 which shows an optical recording system having both reading and writing abilities in which a tracking system is provided for positioning the read/write head. In particular, the system shown in the publication relates to the use of an optical media disk which has a prewritten servo track. In one embodiment of that disclosure shown in FIGS. 6 and 7, a diffraction grating is used to generate a zero order beam together with plus one and minus one order beams which lie tangentially on the servo track ahead of and behind the zero order radiation beam, respectively. The diffraction grating in that disclosure is positioned so that the plus one order beam is positioned to one side of the center of the servo track and the minus one order beam is positioned to the opposite side of the center of the radiation track, leaving the zero order beam centered on the servo track.

Should the radial position alignment of the read/write beam change with respect to the servo track, a detector control system using the plus one and minus one order beams is used to adjust the radial position of the read/write beam in order to maintain servo track centering. Because the plus one and minus one order beams are in a fixed position with respect to the center of the servo track and because there is a time difference between the signals detected by the leading plus one order beam and the minus one order beam with respect to the same location on the information disk, the responsiveness of the system shown in the publication is not optimum for all tracking conditions.

SUMMARY OF THE INVENTION

The present invention relates to a tracking system for an optical recording system which has application to both the read mode and the write mode. According to the present invention, the read and write radiation beam is passed through a diffraction grating in order to generate a plus one and minus one order beam in addition to the zero order, primary radiation beam. The plus one and minus one order radiation beams are generated to lead and to follow the zero order radiation beam on an information track on an optical recording media disk. The radiation beams reflected from the media are passed to a detector array where separate detectors detect the plus one and minus one order radiation beams and a main detector detects the zero order radiation beam.

The diffraction grating is driven by an oscillating driver to cause the plus one and minus one order beams to wobble, that is to move inward and outward radially, in the opposite direction from one another, while leaving the zero order radiation beam unaffected by the diffraction grating drive. The outputs of the plus one and minus one order beam detectors therefore represent the outputs of detectors which are wobbling across the center of an information track on an optical recording disk. These detector outputs are passed through a differential amplifier, a band pass filter and a synchronous amplifier-detector to generate a position error signal which represents an error signal of the radial tracking position of the radiation beams with respect to the information track on an optical recording media disk.

IN THE FIGURES

FIG. 1 shows an optical recording system having a radial position error detecting system according to the present invention in schematic block diagram form.

FIGS. 3A and 3B show the relationship of radiation beams generated according to the present invention with respect to an information track on optical recording media where the position of the radiation beams is out of alignment in FIG. 3A and in alignment in FIG. 3B.

FIGS. 4A and 4B show the output signals of the detector elements according to the present invention as shown in FIG. 1 for the radiation beam relationships shown in FIGS. 3A and 3B, respectively.

DESCRIPTION OF THE PREFERRED EMBODIMENT

Figure 2:
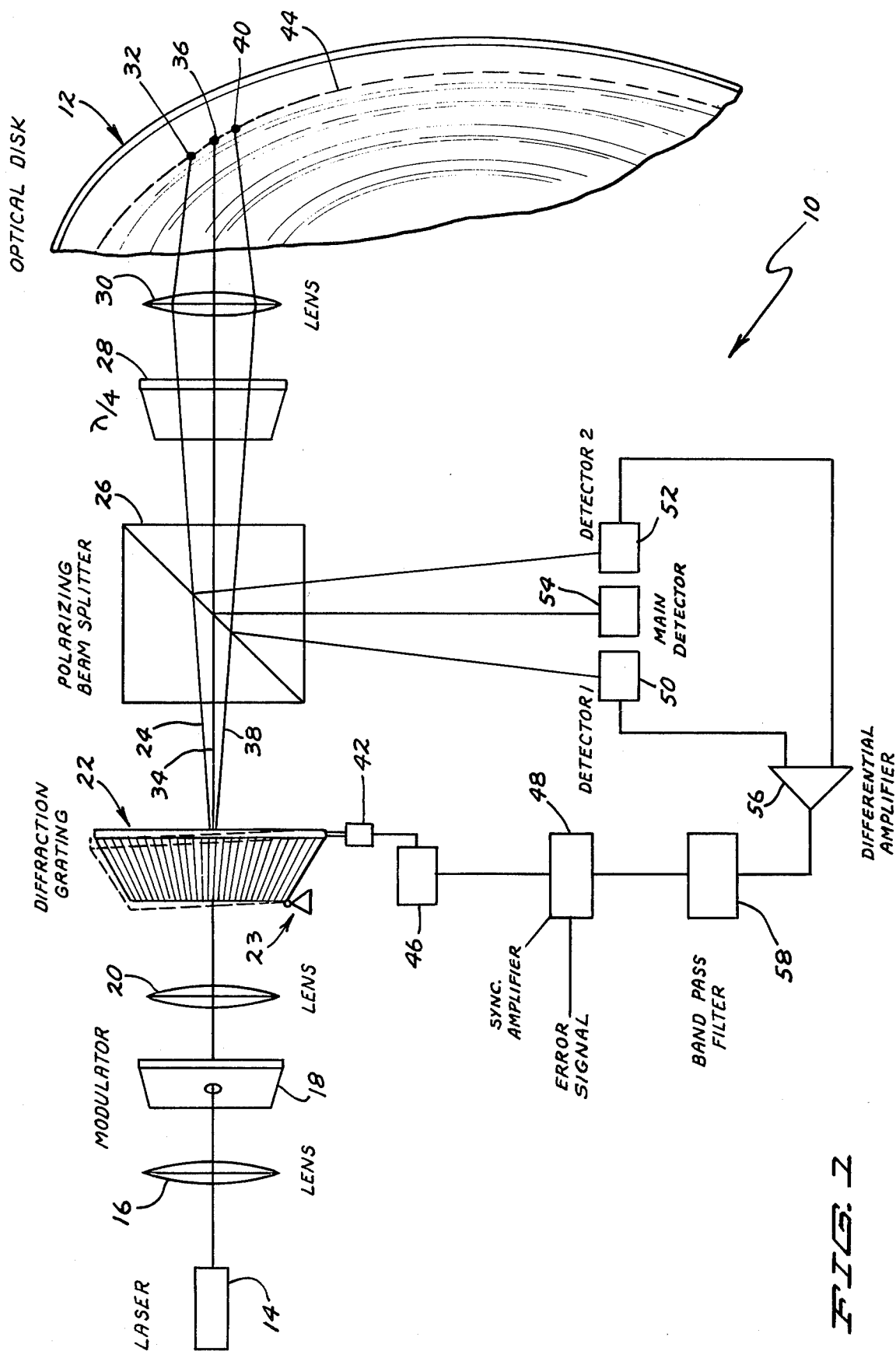
FIGS. 2A and 2B show schematically the relationship of radiation beams generated according to the present invention with respect to information tracks on an optical media recording disk.

Referring now to FIG. 1, an optical recording system 10 according to the present invention is shown schematically in operation for use with respect to an optical media recording disk 12. The optical recording system has a conventional laser 14 for use during both reading and writing operations. Although optical recording systems may vary according to various embodiments of the present invention, the system of FIG. 1 is shown with a first lens 16 receiving the laser radiation beam from laser 14, an accoustical-optical modulator 18 and another lens 20. The modulator 18 modulates the laser beam in a known fashion during the writing operation.

The system according to the present invention uses a diffraction grating 22 placed in the laser beam for the purpose of generating a plus one and a minus one order radiation beam in addition to the zero order radiation beam originally generated by laser 14. The plus one order radiation beam is shown at 24 passing through a polarizing beam splitter 26, shown schematically, a quarter-wave plate 28, an objective focusing lens 30 and arriving on the optical media disk 12 to create a spot of light 32. The quarter-wave plate 28 works with the polarizing beam splitter 26 in a known fashion so that reflected radiation beams from the disk 12 pass out of the polarizing beam splitter 26 in a different direction than the incoming radiation beams from the laser 14 and diffraction grating 22. Similarly, the zero order light beam 34 passes through the polarizing beam splitter 26, the quarter-wave plate 28 and the objective focusing lens 30 to form a radiation beam spot 36 on the optical media disk 12. Finally, the minus one order radiation beam 38 passes through the polarizing beam splitter 26, the quarter-wave plate 28 and the objective focusing lens 30 to form a radiation beam spot 40 on the optical media disk 12.

According to the present invention, the diffraction grating 22 is pivotally mounted at a support 23 and is driven by a mechanical means 42, such as a piezoelectric crystal, to oscillate in a fashion so that the plus one and minus one order radiation beams 24 and 38 respectively are wobbled in a radial direction on the disk 12 about the center line position of an information track 44. Thus, the radiation beam spot 32 and the radiation beam spot 40 wobble inwardly and outwardly around the center of the information track 44 while the zero order radiation beam 36 remains unaffected by the oscillating drive of the diffraction grating 22. Because of the arrangement of the diffraction grating 22, the polarizing beam splitter 26, the quarter-wave plate 28 and the objective focusing lens 30, the radiation beam spots 32 and 40 move in the opposite direction radially with respect to one another during this wobbling motion. The mechanical means 42 for driving the diffraction grating 22 receives its drive input from a grating driver 46 which generates a drive frequency oscillation of, for example, 20 to 30 KHz. The grating driver 46 also has an output containing the proper phase and frequency of the grating drive which is connected to a synchronous amplifier-detector 48.

Upon reflection from the optical media disk 12, the radiation beams 24 and 38 are reflected to different detectors in a dectector array. Because of their different positions on the optical disk 12 and the arrangement of the polarizing beam splitter 26 and the objective lens 30, this detector array allows for the plus one order beam 24 to be returned to detector 1 which is detector 50 in the detector array. Similarly, the minus one order radiation beam 38 is reflected to detector 2 which is detector 52 in the detector array. A main detector 54 receives the primary or zero order radiation beam. The main detector is responsible for reading information from the optical recording disk 12 and for providing focusing feedback for the focus system of the objective lens 30. These functions may occur in a known fashion. The outputs of the first detector and the second detector, that is, detectors 50 and 52, are connected as inputs to a differential applifier 56 which forms an output difference signal representative of the difference between the detected signals.

The output of differential amplifier 56 is connected to a band pass filter 58 which passes the difference signal but attenuates any high frequency oscillation signal component with which the diffraction grating 22 is driven. The filtered signal is connected from the band pass filter 58 to the synchronous amplifier-detector 48. The output of this amplifier-detector 48 represents an error signal based on the difference in signals detected by detectors 50 and 52 and also corresponds to a position error signal of the radiation beams 32 and 40 in following the information track 44 on the optical media disk 12.

Referring now to FIG. 2A, an information track 60 is shown schematically as it would appear on an optical media disk. The sides or boundaries of the normal track width are shown by dotted lines at 62 and 64. The information track is shown with schematically indicated information bits written at 66, 70, 74, 68 and 76. In this example, the plus one order radiation beam is shown impinging on the information bit 66 with a dotted line representation of the beam 78. The zero order radiation beam impinges on location 72 and the minus one order radiation beam impinges at location 80. This Figure represents a showing where the diffraction grating 22 in a system according to that of FIG. 1 is one extreme position of its wobble excursion showing the plus one and minus one order radiation beams disposed equally and oppositely with respect to the center of the information track 60. FIG. 2A shows the same relationship of information bits 66, 70, 74, 68 and 76 with respect to an information track 60 having edges at 62 and 64. However, in this showing the diffraction grating would be at the opposite excursion from that shown in FIG. 2A and having the radiation beams impinging at spots 82 and 84 for the plus one order radiation beam and minus one order radiation beam, respectively.

Referring now to FIGS. 3A and 4A, a radiation track 60 is again shown with an arrow indicating the direction of motion of the optical media disk with respect to the impinging radiation beams. Similarly, information bits are written, as before, at 66, 70, 74, 68 and 76. In FIG. 3A the position of the optical read/write head is displaced with respect to the center line of the information track 60 so that the plus one order radiation beam 78 is displaced totally off the information track so that the reflected radiation beam as detected by detector 50 would not show information bits 66, 70, 74, 68, 76. The zero order radiation beam is shown schematically at 72 where it is off the center line of the track 60 and would only partially detect with a partial signal the information bits in the information track. Finally, the minus one order radiation beam 80 is closer to the center of track 60 and fully detects information bits on the track. This is as opposed to the condition of only partially detecting information bits which would normally occur at this position if the zero order beam 72 is centered on the information track 60.

Referring now to FIG. 4A, the output of detector 50 is shown diagrammatically with respect to time as a straight line showing that the detector in that position does not detect any of the information bits 66, etc. The main detector 54 is shown schematically detecting only a partial signal for information bits at peaks 66a, 70a, 74a, 68a and 76a. Finally, the minus one order detector, or detector 52, in FIG. 1 detects, in this position, a full reading for the information bits as shown at peaks 66b, 70b, 74b, 68b and 76b. Thus, the differential signal between detector 1 and 2 clearly shows that the information track is off center with respect to the zero order radiation beam and shows the direction in which the track is off center so that the proper error correction signal can be generated showing the amount and direction of movement required to restore proper track centering.

This error correction information becomes available with a strong differential output signal while the main detector 54, as shown in FIG. 1 is still producing a useable output signal. Note, however, that the main detector output signal alone, while diminished and indicating an off track center indication, does not indicate in which direction the system is off the center of the track. Thus, a track centering system based on only a single detector will show that the system is not tracking the center of the track any longer but does not produce required information to show the proper direction in order to restore a track centered condition.

Referring now to FIG. 3B, the information spots 66, 70, 74, 68 and 76 are shown as before. FIG. 3B represents a track centered condition in which the primary or zero order light beam reflected back to the main detector 54 represents an on-track and centered condition as shown at 72 in the Figure. The light spot 78 representing the plus one order beam is shown partially reading the information bit 66 while the light spot 80 representing the minus one order beam is shown partially reading the information bit 76. FIG. 4B, having the outputs of detectors 50, 52 and 54 corresponding to the situation shown in FIG. 3B shows that detectors 1 and 2 produce outputs representative of a partially written condition at peaks 66c, 70c, 74c, 68c and 76c for detector number 1 and at 66d, 70d, 74d, 68d and 76d for detector 2, that is detector 52. It is noted, that because of the position displacement with respect to the light beams 32 and 40 reflected back to detectors 50 and 52, respectively, the signals represented in 4B are correspondingly time displaced on the time axis. The main detector output shows larger signal peaks representing a full strength reading condition where the zero order beam fully encounters the information bits as shown at 66f, 70f, 74f, 68f and 76f.

The bit density per track and the revolution rate of the optical disk is such that numerous information bits should pass beneath detectors 50, 52 and 54 in each wobble position of the diffraction grating 22. For example, it could be expected that an optical recording system using the present invention could operate at a data rate of approximately 2.5 MHz. while the diffraction grating may operate at a rate of approximately 20 KHz. Thus, a total of 125 bits of information may pass through the detection array during each full oscillation of the diffraction grating 22. Detectors 50 and 52 are designed in combination with differential amplifier 56 so that a time average signal is formed of the information bit signals as detected and represented, for example, by FIGS. 4A and 4B. This is because of the time displacement that occurs with the actual detection of individual information bits at detector 50 with respect to detector 52. This time average may have a very fast time constant, however, because of the very high data rate and the fast desired time response of the system to a position error with respect to the center of the information track. Thus, the output of differential amplifier 56, as shown in FIG. 1, will be a time averaged error signal to eliminate individual peaks representative of individual detected data bits on the information track.

The band pass filter 58 removes any unwanted signal outside the frequency spectrum for error detection and corrections.

Synchronous amplifier-detector 48 in conjunction with the band pass filter 58 act to amplify the error signal and to switch the sense of the error signal in synchronization with the switching of the plus one order and minus one order radiation beams from one side to the other side of the center of the information track. That is, the detector output error signal must contain both amplitude information representative of the degree to which the off of center track condition exists and the direction in which it exists. However, because the plus one and minus one order radiation beams are being switched constantly from one side of the track to the other, the detector also must be switched constantly in order to preserve the proper sense of signal output.

What is claimed is:

1. An information track centering system for optical recording comprising, an optical recording system having a source of radiation and an optical recording media disk, support means for a diffraction grating, diffraction grating means pivotally mounted to said support means and interposed between said radiation source and said optical disk media, means for pivotally driving said diffraction grating so that first order leading beam and first order trailing beam radiation spots created by said diffraction grating on said optical media disk are caused to wobble radially, inwardly and outwardly about the center of an information track on said media in opposite directions, respectively, while said primary radiation beam spot is unaffected by the wobbling of said diffraction grating, first and second detector means arranged to detect the reflected radiation beams from said record media disk representative of said first order leading beam and said first order trailing beam, respectively, means for forming a time averaged difference signal with respect to the output of said first and second detectors to produce an error signal representative of the difference in amplitude in information bits as detected by said first and second detectors, band pass filter means for removing from said error signal any unwanted signal outside the frequency spectrum for error detection and correction, and synchronous amplifier-detector means connected to the output of said band pass filter means for producing the system output error signal having an amplitude representative of the distance with which said system is off the center of an information track and switched in synchronization with the wobbling frequency of said diffraction grating so that the output error signal has information representative of the direction in which said system is moved from the center of an information track.

2. An information tracking device for a track centering system of an optical recording system using optical disk media, said centering system being of the type comprising beam generating means including diffraction grating means for generating a first order leading beam and a first order trailing beam with respect to a primary zero order beam of radiation, drive means for oscillating said diffraction grating means for generating said first and second order radiation beams at a high frequency inwardly and outwardly radially with respect to an information track in a wobble motion leaving said zero order beam unaffected, and means for detecting the reflected first and second order radiation beams received from said optical disk media, means for generating a time averaged difference signal with respect to said first and second order detected beams and means for generating an output error signal representative of the distance and direction with respect to which said system is removed from the center of an information track.

3. A track center detecting system for an optical recording system comprising, a radiation beam generating means, a diffraction grating means pivotally mounted for movement for generating a wobbling first order trailing radiation beam and a wobbling first order leading radiation beam while passing a primary zero order radiation beam without causing radial movement of said primary zero order radiation beam, a polarizing beam splitter for passing said first order leading and trailing radiation beams and said zero order radiation beam, a quarter-wave plate for passing said radiation beams and changing the direction of polarization thereof, objective lens focusing means for focusing said three radiation beams on said optical media disk, first and second detector means for receiving and first leading order beam and second detector means for receiving said first order trailing beam reflected from said optical media disk, means for forming a time averaged difference signal from the output signals of said first and second detectors as representative of information bits read by said first and second detectors from the information track on said optical media disk, band pass filter means for removing from said differential amplifier output error signal any unwanted signal outside the frequency spectrum for error detection and correction, and synchronous amplifier-detector means connected with the output of said band pass filter means for producing an output error signal having information with respect to the distance with which said system is off the center of said information track and the direction with which said system is removed from the center of said information track.

* * * * *